US011819882B2

(12) United States Patent
Ueno et al.

(10) Patent No.: US 11,819,882 B2
(45) Date of Patent: Nov. 21, 2023

(54) VIBRATION MOTOR AND DRIVING DEVICE

(71) Applicant: SEIKO EPSON CORPORATION, Tokyo (JP)

(72) Inventors: Mizuho Ueno, Okaya (JP); Takao Miyazawa, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 36 days.

(21) Appl. No.: 17/742,428

(22) Filed: May 12, 2022

(65) Prior Publication Data

US 2022/0362806 A1 Nov. 17, 2022

(30) Foreign Application Priority Data

May 14, 2021 (JP) ................................. 2021-082187

(51) Int. Cl.
 *B06B 1/06* (2006.01)
(52) U.S. Cl.
 CPC .................................. *B06B 1/0629* (2013.01)
(58) Field of Classification Search
 CPC ...... H02N 2/003; H02N 2/0065; H02N 2/026; H02N 2/028; H02N 2/0055; H02N 2/103; H02N 2/001; H02N 2/005; B06B 1/0629
 See application file for complete search history.

(56) References Cited

U.S. PATENT DOCUMENTS

| 2009/0278421 | A1  | 11/2009 | Hamamoto et al. |
| 2012/0279342 | A1* | 11/2012 | Yasukawa ............ B25J 15/0009 |
|              |     |         | 294/213 |
| 2018/0287515 | A1  | 10/2018 | Takahashi |
| 2019/0222145 | A1* | 7/2019  | Oda ....................... H02N 2/026 |

FOREIGN PATENT DOCUMENTS

| JP | H08237971 A | 9/1996 |
| JP | H0937575 A | 2/1997 |
| JP | 2009033788 A | 2/2009 |
| JP | 2009278702 A | 11/2009 |
| JP | 2018174641 A | 11/2018 |
| JP | 2019088048 A | 6/2019 |

* cited by examiner

*Primary Examiner* — Emily P Pham
(74) *Attorney, Agent, or Firm* — Yu Gang (57) ABSTRACT

A vibration motor includes a first vibrating body including a first projection and a second vibrating body including a second projection, the first vibrating body and the second vibrating body receiving electric power and vibrating to generate a driving force and transmitting the driving force to a driven section, a first coil spring configured to urge the first vibrating body and the second vibrating body in a driving direction and restrict positions of the first vibrating body and the second vibrating body in the driving direction, and a case housing the first vibrating body, the second vibrating body, and the first coil spring. The first vibrating body, the second vibrating body, and the first coil spring are arranged in the driving direction. The number of first coil springs is smaller than the number of first and second vibrating bodies in the urging direction.

6 Claims, 10 Drawing Sheets

VIBRATION MOTOR AND DRIVING DEVICE

The present application is based on, and claims priority from JP Application Serial Number 2021-082187, filed May 14, 2021, the disclosure of which is hereby incorporated by reference herein in its entirety.

BACKGROUND

1. Technical Field

The present disclosure relates to a vibration motor and a driving device.

2. Related Art

A vibration motor including a piezoelectric ceramic plate, which is a vibrating body, is applied to various devices. The vibration motor vibrates the piezoelectric ceramic plate. A sliding section that slides with a driven section is set on the piezoelectric ceramic plate. The sliding section repeats contact with and separation from the driven section, whereby the driven section moves. A direction in which the driven section moves is referred to as driving direction.

JP-A-2009-33788 (Patent Literature 1) discloses a vibration motor functioning as an ultrasonic motor. According to Patent Literature 1, the vibration motor includes a first coil spring and a second coil spring. The second coil spring urges a piezoelectric ceramic plate toward a driven section. The first coil spring urges the piezoelectric ceramic plate in a driving direction orthogonal to a direction in which the second coil spring urges the piezoelectric ceramic plate. The urged piezoelectric ceramic plate presses a wall of a case.

An electrode is disposed on the piezoelectric ceramic plate. When a driving voltage having a predetermined waveform is supplied to the electrode, the urged piezoelectric ceramic plate reciprocates along the wall of the case. In parallel to the reciprocation, the piezoelectric ceramic plate performs movement for switching a direction in which the piezoelectric ceramic plate warps. Accordingly, a track of the sliding section becomes elliptical and the driven section is driven.

The vibration motor disclosed in Patent Literature 1 includes a pair of a vibrating body and a coil spring. When pluralities of vibrating bodies and coil springs are arranged in the driving direction in order to increase an output of the vibration motor, the length of the vibration motor in the driving direction increases.

SUMMARY

A vibration motor includes: a plurality of vibrating bodies including projections, the vibrating bodies receiving electric power and vibrating to generate a driving force and transmitting the driving force to a driven section; a first urging section configured to urge the plurality of vibrating bodies in a driving direction and restrict positions of the vibrating bodies in the driving direction; and a case housing the plurality of vibrating bodies and the first urging section. The plurality of vibrating bodies and the first urging section are arranged in the driving direction. A number of the first urging sections is smaller than a number of the vibrating bodies in the urging direction.

A driving device includes: a moving table; and the vibration motor configured to move the moving table.

DESCRIPTION OF EXEMPLARY EMBODIMENTS

First Embodiment

Figure 1:
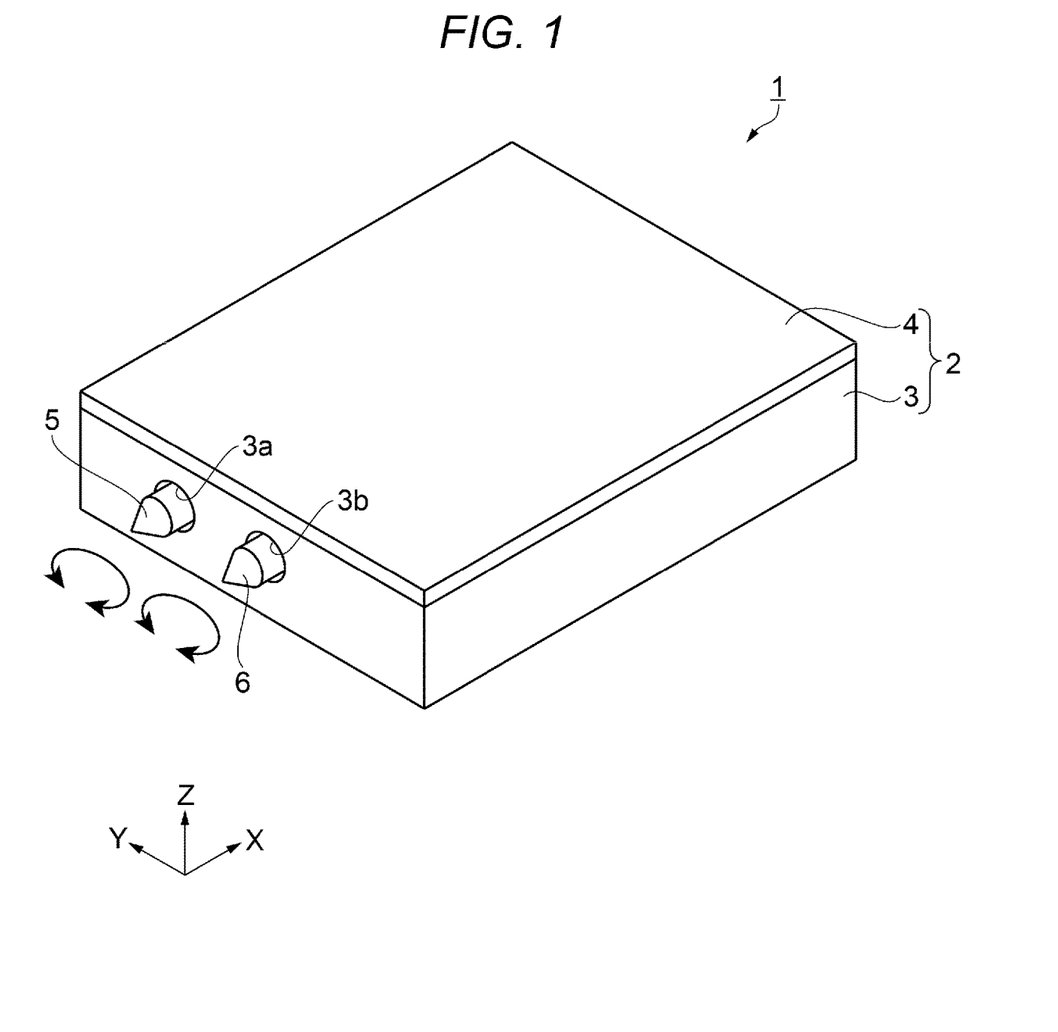
FIG. 1 is a schematic perspective view showing the configuration of a vibration motor according to a first embodiment.

In a first embodiment, a characteristic example of a vibration motor is explained with reference to the drawings. As shown in FIG. 1, a vibration motor 1 includes a rectangular parallelepiped case 2. The longitudinal direction of the case 2 is represented as an X direction. The thickness direction of the case 2 is represented as a Z direction. A direction orthogonal to the X direction and the Z direction is represented as a Y direction.

The case 2 includes a case main body 3 and a lid section 4. The lid section 4 is fixed to the case main body 3 by not-shown screws. The case main body 3 includes a first hole 3a and a second hole 3b on a surface in an X negative direction. A first projection 5 functioning as the projection projects from the first hole 3a. A second projection 6 functioning as the projection projects from the second hole 3b. The ends on an X negative direction side of the first projection 5 and the second projection 6 are formed in a conical shape. The first projection 5 and the second projection 6 are arranged in the Y direction. The first projection 5 and the second projection 6 move on an elliptical track with the Z direction as an axis.

Figure 2:
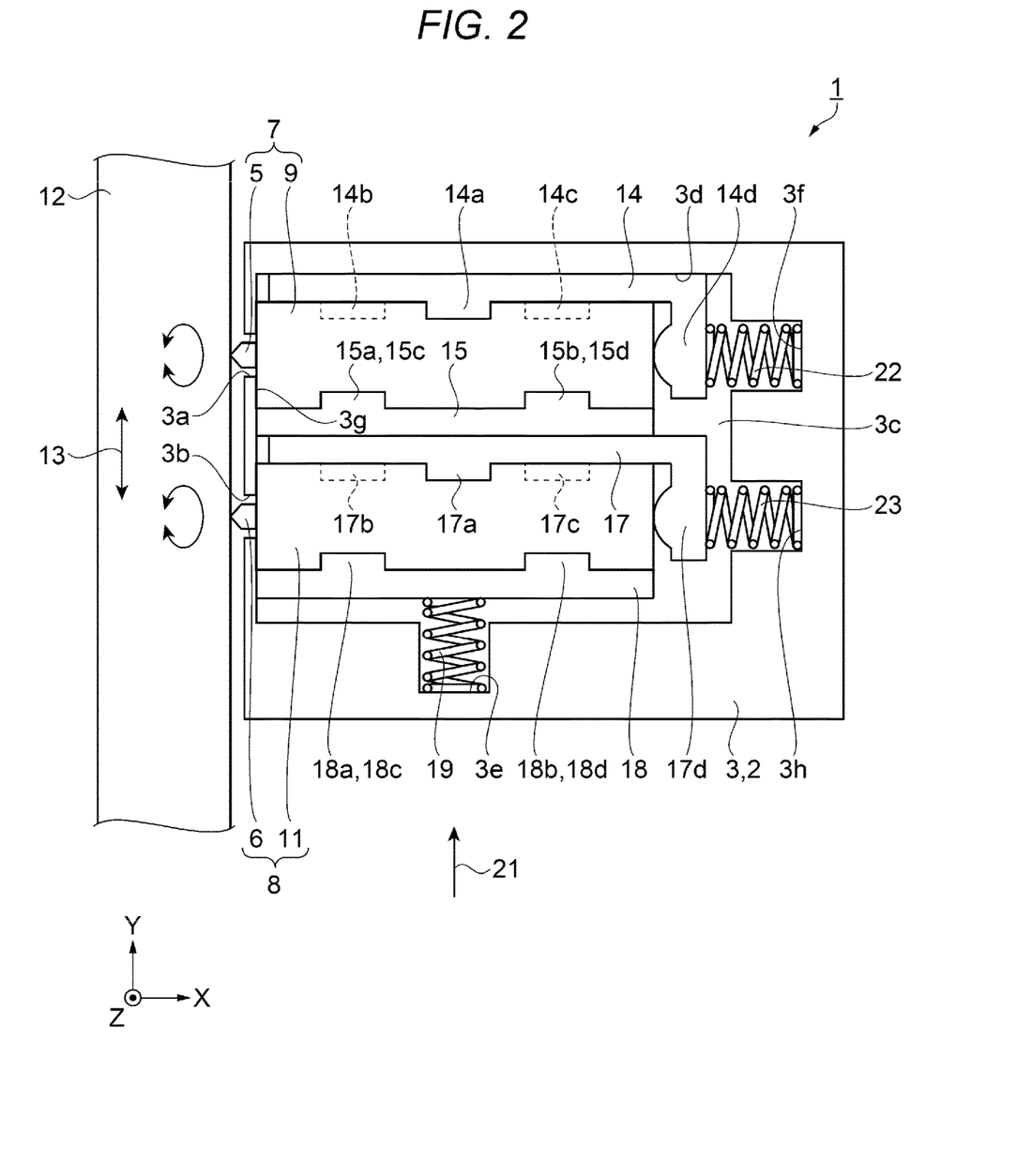
FIG. 2 is a schematic plan view showing the configuration of a vibration motor.

FIG. 2 is a diagram in which the lid section 4 is removed from the case 2. As shown in FIG. 2, the vibration motor 1 includes a first vibrating body 7 functioning as the vibrating body and a second vibrating body 8 functioning as the vibrating body. The first vibrating body 7 includes the first projection 5 and a first piezoelectric body 9. The first projection 5 is fixed to the surface on the X negative direction side of the first piezoelectric body 9. Not-shown four electrodes are disposed in the first piezoelectric body 9. The first piezoelectric body 9 can be extended and contracted in the X direction and bent in a Y positive direction by controlling a combination of voltages applied to the four electrodes. The extension and contraction and the bending of the first piezoelectric body 9 are controlled, whereby the first projection 5 moves on the elliptical track.

The second vibrating body 8 includes the second projection 6 and a second piezoelectric body 11. The second projection 6 is fixed to the surface on the X negative direction side of the second piezoelectric body 11. The second piezoelectric body 11 has the same structure as the structure of the first piezoelectric body 9. Therefore, the extension and contraction and the bending of the second piezoelectric body 11 are controlled, whereby the second projection 6 moves on the elliptical track. The first projection 5 and the second projection 6 move clockwise and counterclockwise. The material of the first piezoelectric body 9 and the second piezoelectric body 11 is not particularly limited. However, in this embodiment, for example, piezoelectric ceramics are used as the material.

The vibration motor 1 is used with the first projection 5 and the second projection 6 pressed against a driven section 12. The first projection 5 and the second projection 6 move on the elliptical track, whereby the driven section 12 moves in a driving direction 13, which is the Y direction.

The first vibrating body 7 includes the first projection 5. The second vibrating body 8 includes the second projection 6. The first vibrating body 7 and the second vibrating body 8 receive electric power and vibrate to generate a driving force and transmit the driving force to the driven section 12.

Figure 3:
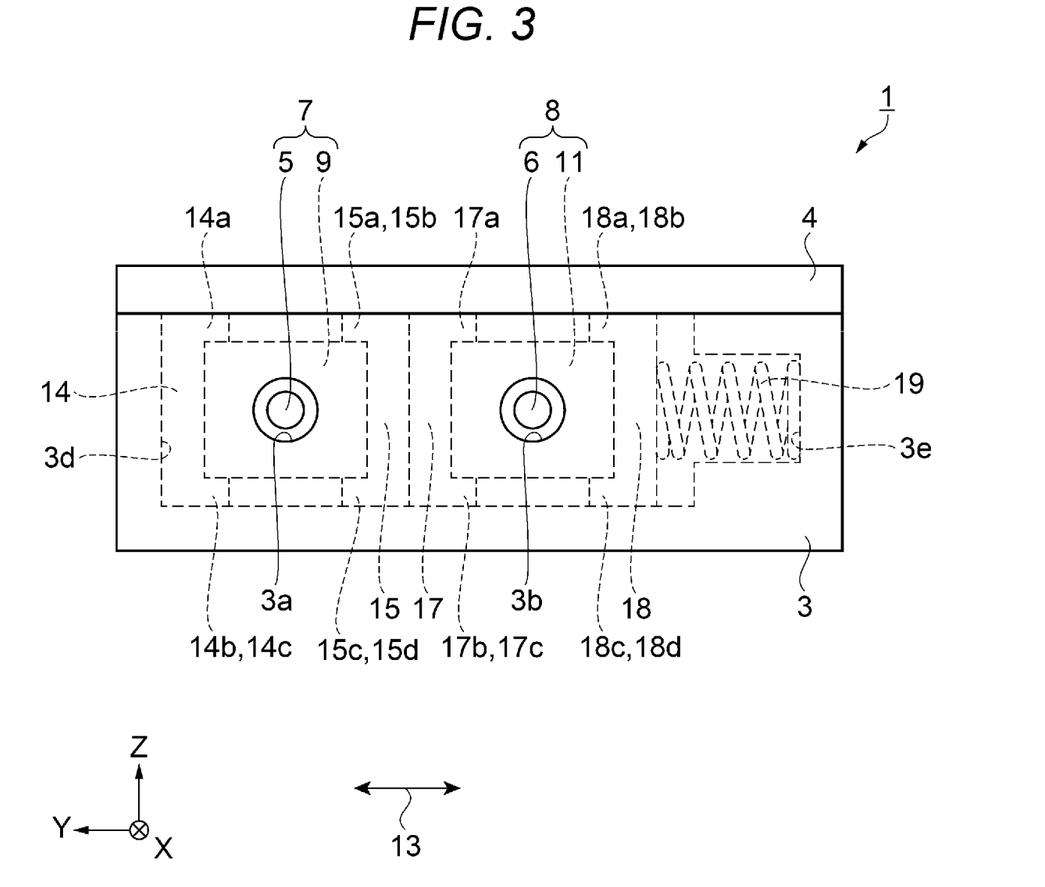
FIG. 3 is a schematic side view showing the configuration of the vibration motor.

As shown in FIGS. 2 and 3, the first vibrating body 7 is sandwiched by a first guide section 14 and a second guide section 15 in the driving direction 13. When the first piezoelectric body 9 extends and contracts in the X direction, the first piezoelectric body 9 slides with the first guide section 14 and the second guide section 15. The first guide section 14 includes a first claw section 14a on a Z positive direction side. The first guide section 14 includes a second claw section 14b and a third claw section 14c on a Z negative direction side. The second guide section 15 includes a fourth claw section 15a and a fifth claw section 15b in the Z positive direction side. The second guide section 15 includes a sixth claw section 15c and a seventh claw section 15d in the Z negative direction side. The first claw section 14a to the third claw section 14c and the fourth claw section 15a to the seventh claw section 15d restrict movement in the Z direction of the first piezoelectric body 9.

The second vibrating body 8 is sandwiched by a third guide section 17 and a fourth guide section 18 in the driving direction 13. When the second piezoelectric body 11 extends and contracts in the X direction, the second piezoelectric body 11 slides with the third guide section 17 and the fourth guide section 18. The third guide section 17 includes an eighth claw section 17a on the Z positive direction side. The third guide section 17 includes a ninth claw section 17b and a tenth claw section 17c on the Z negative direction side. The fourth guide section 18 includes an eleventh claw section 18a and a twelfth claw section 18b on the Z positive direction side. The fourth guide section 18 includes a thirteenth claw section 18c and a fourteenth claw section 18d on the Z negative direction side. The eighth claw section 17a to the tenth claw section 17c and the eleventh claw section 18a to the fourteenth claw section 18d restrict movement in the Z direction of the second piezoelectric body 11.

As shown in FIG. 2, the case main body 3 includes a recess 3c on the inside. The first hole 3a and the second hole 3b communicate with the recess 3c. The first guide section 14 is in contact with a first surface 3d functioning as the inner surface on a Y positive direction side of the recess 3c. A second surface 3e parallel to the first surface 3d is disposed on a Y negative direction side of the recess 3c. A first coil spring 19 functioning as the first urging section is disposed between the second surface 3e and the fourth guide section 18. The first guide section 14, the first vibrating body 7, the second guide section 15, the third guide section 17, the second vibrating body 8, the fourth guide section 18, and the first coil spring 19 are disposed in this order between the first surface 3d and the second surface 3e. The case 2 houses the first vibrating body 7, the second vibrating body 8, and the first coil spring 19. The first vibrating body 7 and the second vibrating body 8 are disposed between the first surface 3d of the case 2 and the first coil spring 19.

With this configuration, the first vibrating body 7, the second vibrating body 8, and the first coil spring 19 are arranged in this order in the case 2. After the first vibrating body 7 and the second vibrating body 8 are disposed in the case 2, the first coil spring 19 is disposed between the second vibrating body 8 and the second surface 3e of the case 2, whereby the vibration motor 1 is assembled. Therefore, the vibration motor 1 can be assembled with high assemblability.

The first coil spring 19 urges the first guide section 14, the first vibrating body 7, the second guide section 15, the third guide section 17, the second vibrating body 8, and the fourth guide section 18 in an urging direction 21. The urging direction 21 is a direction parallel to the driving direction 13. The first coil spring 19 urges the first vibrating body 7 and the second vibrating body 8 in the driving direction 13 and restricts the positions of the first vibrating body 7 and the second vibrating body 8 in the driving direction 13. The first vibrating body 7, the second vibrating body 8, and the first coil spring 19 are arranged in the driving direction 13. One first coil spring 19 is provided in the urging direction 21 and is less than two first and second vibrating bodies 7 and 8.

With this configuration, the vibration motor 1 includes the first vibrating body 7 and the second vibrating body 8. The first vibrating body 7, the second vibrating body 8, and the first coil spring 19 are arranged in the driving direction 13. The first coil spring 19 urges the first vibrating body 7 and the second vibrating body 8 in the driving direction 13. The number of first coil springs 19 is smaller than the number of first and second vibrating bodies 7 and 8. Therefore, the length in the driving direction 13 of the vibration motor 1 can be set smaller than when the number of first coil springs 19 is the same as the number of first and second vibrating bodies 7 and 8.

The first guide section 14 includes, on an X positive direction side, a first intermediary section 14d projecting in the Y negative direction. A second coil spring 22 is disposed between a third surface 3f located on the X positive direction side of the recess 3c and the first intermediary section 14d. The second coil spring 22 urges the first vibrating body 7 toward the driven section 12 via the first intermediary section 14d. When the first piezoelectric body 9 extends, the first projection 5 presses the driven section 12. When the first piezoelectric body 9 contracts, the end on the X negative direction side of the first guide section 14 comes into contact with a fourth surface 3g on the X negative direction side of the recess 3c. At this time, since the second coil spring 22 does not urge the first vibrating body 7, the first projection 5 does not press the driven section 12. In FIG. 2, since the first piezoelectric body 9 extends, the first projection 5 presses the driven section 12.

The third guide section 17 includes, on the X positive direction side, a second intermediary section 17d projecting in the Y negative direction. A third coil spring 23 is disposed between a fifth surface 3h located on the X positive direction side of the recess 3c and the second intermediary section 17d. The third coil spring 23 urges the second vibrating body 8 toward the driven section 12 via the second intermediary section 17d. When the second piezoelectric body 11 extends, the second projection 6 presses the driven section 12. When the second piezoelectric body 11 contracts, the end on the X negative direction side of the third guide section 17 comes into contact with the fourth surface 3g on the X negative direction side of the recess 3c. At this time, since the third coil spring 23 does not urge the second vibrating body 8, the second projection 6 does not press the driven section 12. In FIG. 2, since the second piezoelectric body 11 extends, the second projection 6 presses the driven section 12.

The material of the components of the vibration motor 1 is not particularly limited. In this embodiment, for example, the first piezoelectric body 9 and the second piezoelectric body 11 are bulks of a sintered body obtained by sintering a piezoelectric substance. The material of the first projection 5 and the second projection 6 is ceramic. The material of the case main body 3 and the lid section 4 is metal such as an aluminum alloy. The material of the first guide section 14, the second guide section 15, the third guide section 17, and the fourth guide section 18 is nylon or a resin material such as polyacetal resin. The material of the first coil spring 19, the second coil spring 22, and the third coil spring 23 is spring steel. A type of a spring used as the first coil spring 19, the second coil spring 22, and the third coil spring 23 is not limited. For example, a leaf spring may be used as the first coil spring 19, the second coil spring 22, and the third coil spring 23.

Comparative Example

Figure 10:
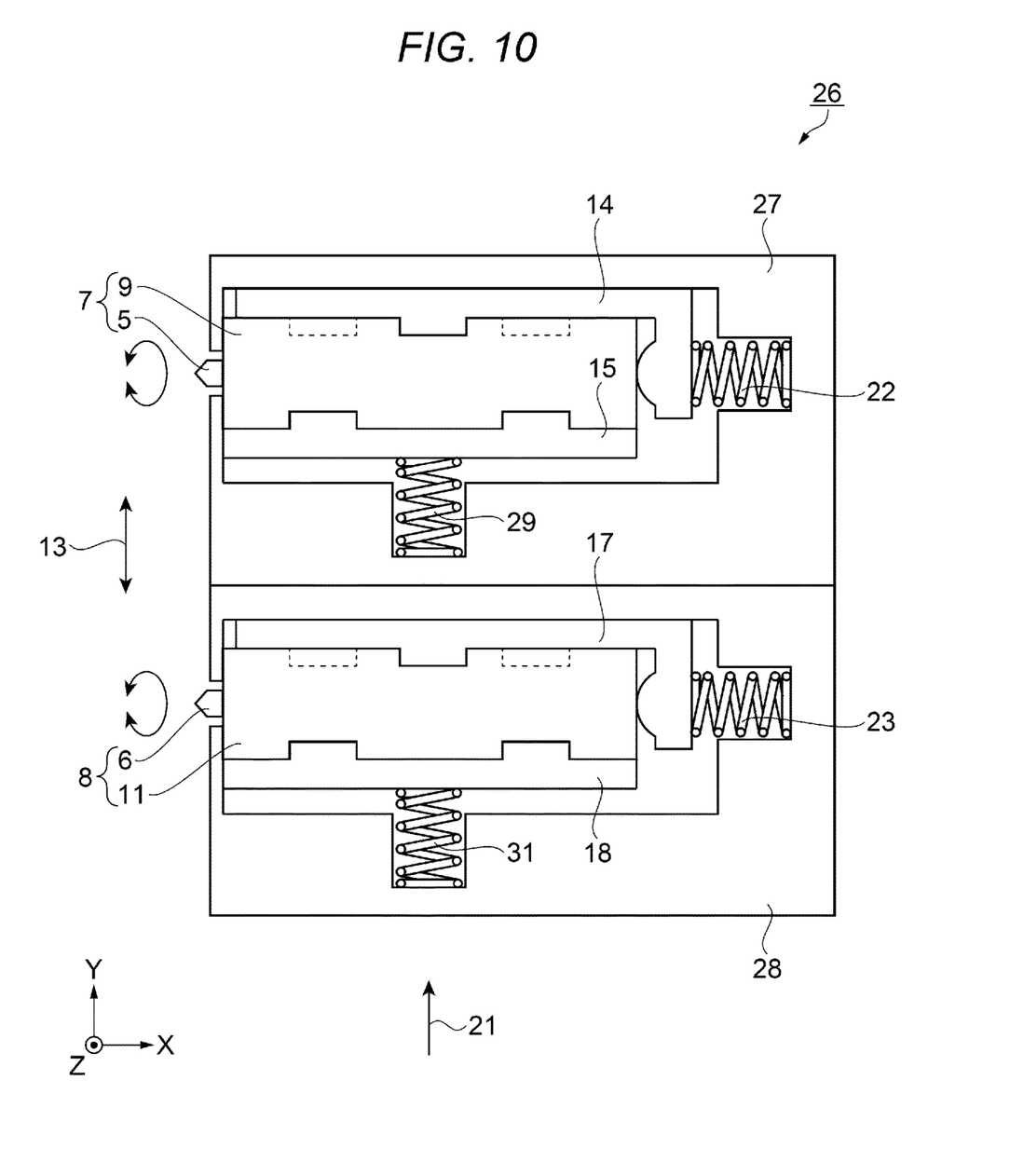
FIG. 10 is a schematic plan view showing the configuration of a vibration motor according to related art.

As shown in FIG. 10, a vibration motor 26 in a comparative example includes a first case main body 27 and a second case main body 28. The first vibrating body 7 and a fourth coil spring 29 are housed in the first case main body 27. The fourth coil spring 29 urges the first vibrating body 7 in the driving direction 13. The second vibrating body 8 and a fifth coil spring 31 are housed in the second case main body 28. The fifth coil spring 31 urges the second vibrating body 8 in the driving direction 13.

In the vibration motor 26, the fourth coil spring 29 is disposed between the first vibrating body 7 and the second vibrating body 8. Therefore, the length in the driving direction 13 of the vibration motor 26 is large. In the vibration motor 1 in the first embodiment, the fourth coil spring 29 is not disposed between the first vibrating body 7 and the second vibrating body 8. Therefore, the length in the driving direction 13 of the vibration motor 1 can be reduced.

Second Embodiment

A second embodiment is different from the first embodiment in that the second coil spring 22 and the third coil spring 23 shown in FIG. 2 are integrated into one coil spring. The same components as the components in the first embodiment are denoted by the same reference numerals and signs and redundant explanation of the components is omitted.

Figure 4:
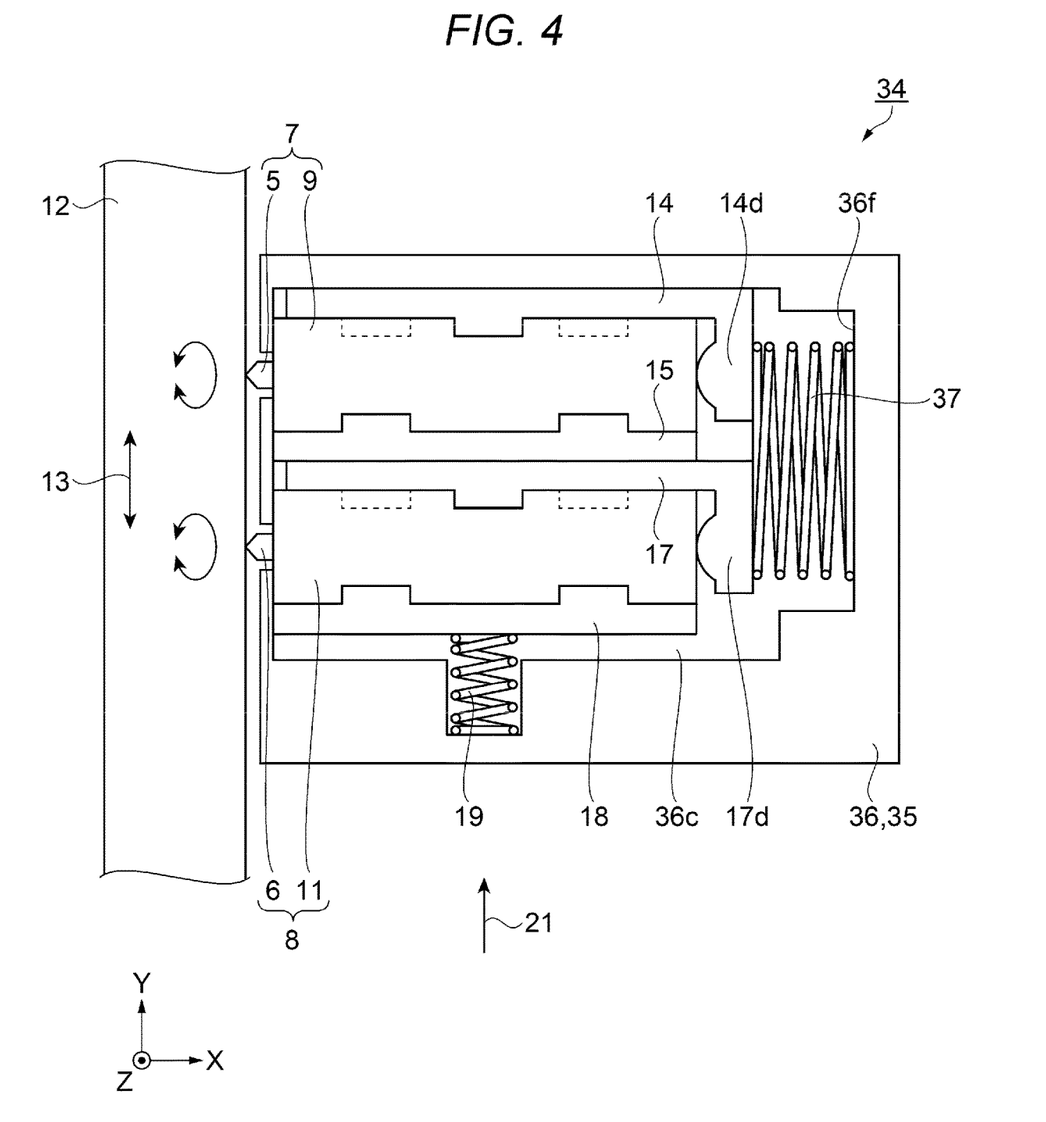
FIG. 4 is a schematic plan view showing the configuration of a vibration motor according to a second embodiment.

As shown in FIG. 4, a vibration motor 34 includes a case 35. The case 35 includes a case main body 36 and a not-shown lid section. A recess 36c is formed in the case main body 36. The first guide section 14, the first vibrating body 7, the second guide section 15, the third guide section 17, the second vibrating body 8, the fourth guide section 18, and the first coil spring 19 are disposed in this order along the driving direction 13 in the recess 36c.

A second coil spring 37 functioning as the second urging section is disposed between a third surface 36f located on the X positive direction side of the recess 36c and the first intermediary section 14d and between the third surface 36f and the second intermediary section 17d. The second coil spring 37 urges the first vibrating body 7 toward the driven section 12 via the first intermediary section 14d. When the first piezoelectric body 9 extends, the first projection 5 presses the driven section 12. The second coil spring 37 urges the second vibrating body 8 toward the driven section 12 via the second intermediary section 17d. When the second piezoelectric body 11 extends, the second projection 6 presses the driven section 12. In FIG. 4, since the first piezoelectric body 9 extends, the first projection 5 presses the driven section 12. Since the second piezoelectric body 11 extends, the second projection 6 presses the driven section 12.

The vibration motor 34 include the second coil spring 37 that urges the first vibrating body 7 and the second vibrating body 8 toward the driven section 12. The number of second coil springs 37 is one. The number of first and second vibrating bodies 7 and 8 is two in a direction in which the first vibrating body 7 and the second vibrating body 8 are arranged. The number of second coil springs 37 is smaller than the number of first and second vibrating bodies 7 and 8 in the driving direction 13 in which the first vibrating body 7 and the second vibrating body 8 are arranged.

With this configuration, the number of second coil springs 37 is smaller than the number of first and second vibrating bodies 7 and 8. Therefore, compared with the first embodiment, the number of times the coil springs are assembled can be reduced when the vibration motor 34 is assembled. As a result, the vibration motor 34 can be assembled with high productivity.

Third Embodiment

A third embodiment is different from the first embodiment in that the second guide section 15 and the third guide section 17 shown in FIG. 2 are integrated. The same components as the components in the first embodiment are denoted by the same reference numerals and signs and redundant explanation of the components is omitted.

Figure 5:
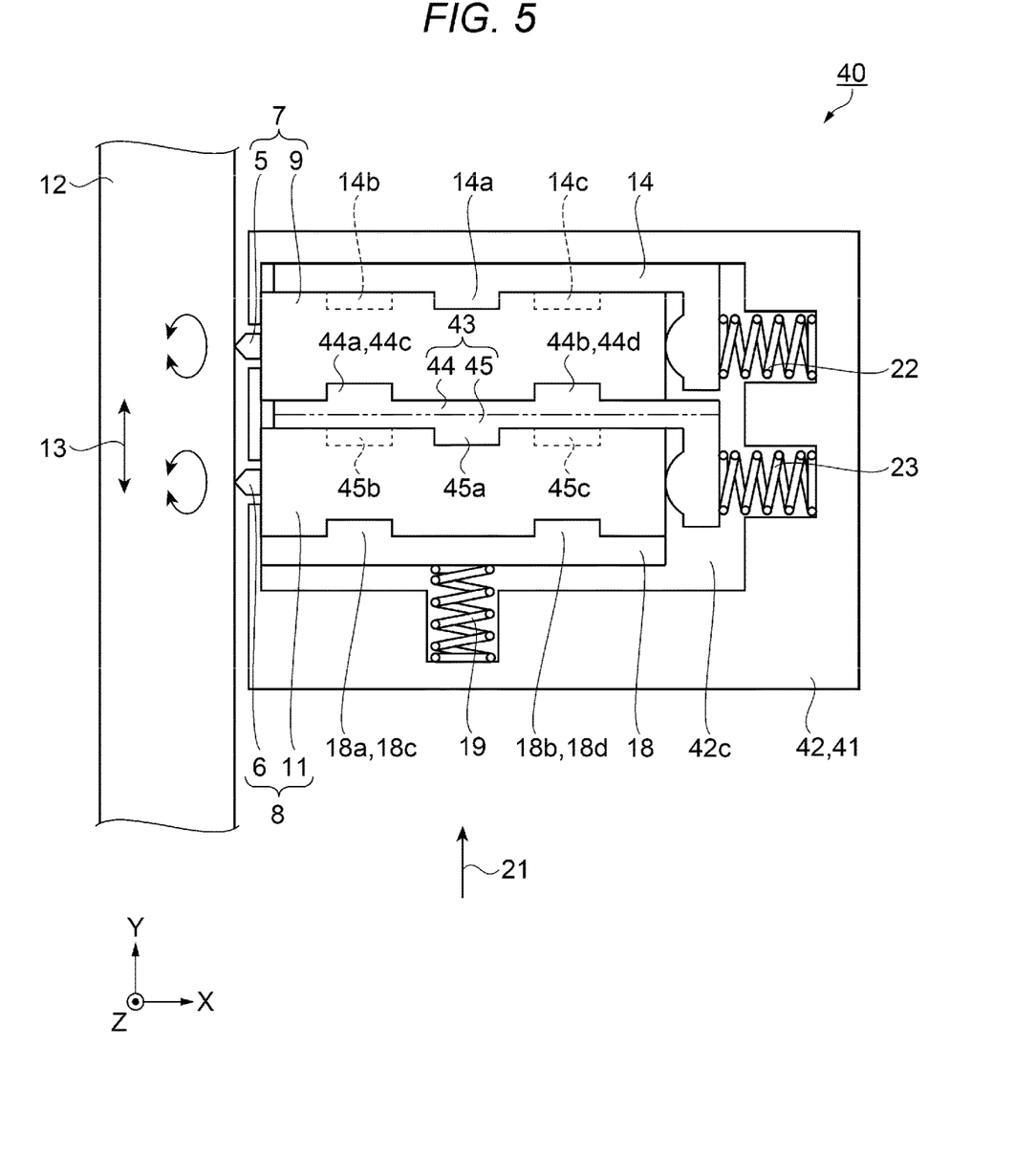
FIG. 5 is a schematic plan view showing the configuration of a vibration motor according to a third embodiment.

As shown in FIG. 5, a vibration motor 40 includes a case 41. The case 41 includes a case main body 42. A recess 42c is formed in the case main body 42. The first guide section 14, the first vibrating body 7, a fifth guide section 43, the second vibrating body 8, the fourth guide section 18, and the first coil spring 19 are disposed in this order along the driving direction 13 in the recess 42c. The vibration motor 40 includes the first vibrating body 7 and the second vibrating body 8. The fifth guide section 43 is disposed between the first vibrating body 7 and the second vibrating body 8. The fifth guide section 43 is configured by a second guide section 44 functioning as the first supporting section and a third guide section 45 functioning as the second supporting section. The second guide section 44 is a portion on the Y positive direction side of the fifth guide section 43. The third guide section 45 is a portion on the Y negative direction side of the fifth guide section 43. In the fifth guide section 43, the second guide section 44 and the third guide section 45 are integrated.

The second guide section 44 includes a fourth claw section 44a and a fifth claw section 44b on the Z positive direction side. The second guide section 44 includes a sixth claw section 44c and a seventh claw section 44d on the Z negative direction side. The first claw section 14a to the third claw section 14c and the fourth claw section 44a to the seventh claw section 44d restrict movement in the Z direction of the first vibrating body 7. The first guide section 14 and the second guide section 44 support the first vibrating body 7.

The third guide section 45 includes an eighth claw section 45a on the Z positive direction side. The third guide section 45 includes a ninth claw section 45b and a tenth claw section 45c on the Z negative direction side. The eighth claw section 45a to the tenth claw section 45c and the eleventh claw section 18a to the fourteenth claw section 18d restrict movement in the Z direction of the second piezoelectric body 11. The third guide section 45 and the fourth guide section 18 support the second vibrating body 8.

With this configuration, the second guide section 44 supports the first vibrating body 7. The third guide section 45 supports the second vibrating body 8. The second guide section 44 and the third guide section 45 are integrated. When the second guide section 44 and the third guide section 45 are separated like the second guide section 15 and the third guide section 17 in the first embodiment, portions having rigidity are necessary respectively in the second guide section 44 and the third guide section 45. When the second guide section 44 and the third guide section 45 are integrated, a portion having rigidity can be a portion common to the second guide section 44 and the third guide section 45. Therefore, when the second guide section 44 and the third guide section 45 are integrated as the fifth guide section 43, the length in the driving direction 13 of the fifth guide section 43 can be reduced compared with when the second guide section 44 and the third guide section 45 are separated.

Fourth Embodiment

A fourth embodiment is different from the first embodiment in that the first coil spring 19 shown in FIG. 2 is disposed between the first vibrating body 7 and the second vibrating body 8. The same components as the components in the first embodiment are denoted by the same reference numerals and signs and redundant explanation of the components is omitted.

Figure 6:
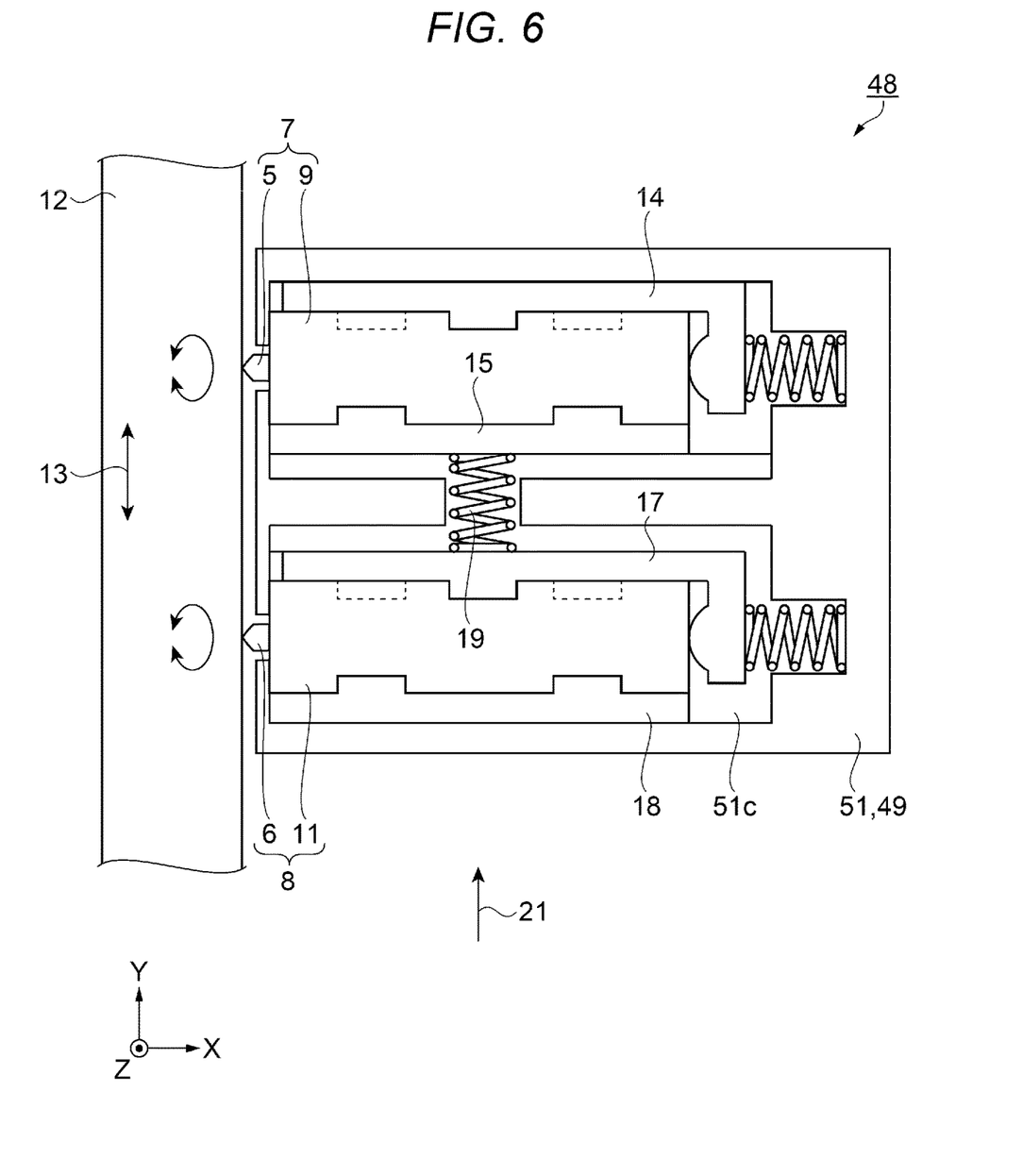
FIG. 6 is a schematic plan view showing the configuration of a vibration motor according to a fourth embodiment.

As shown in FIG. 6, a vibration motor 48 includes a case 49. The case 49 includes a case main body 51. A recess 51c is formed in the case main body 51. The first guide section 14, the first vibrating body 7, the second guide section 15, the first coil spring 19, the third guide section 17, the second vibrating body 8, and the fourth guide section 18 are disposed in this order along the driving direction 13 in the recess 51c.

The first coil spring 19 is disposed between the first vibrating body 7 and the second vibrating body 8. The first coil spring 19 urges the first vibrating body 7 and the second vibrating body 8 in opposite directions from each other. With this configuration, the first vibrating body 7, the first coil spring 19, and the second vibrating body 8 are disposed in this order in the driving direction 13. The first vibrating body 7 and the second vibrating body 8 are line-symmetrical centering on the first coil spring 19. Therefore, limitation of a setting direction can be reduced when the vibration motor 48 is set.

Fifth Embodiment

In a fifth embodiment, a linear stage including any one of the vibration motor 1, the vibration motor 34, the vibration motor 40, and the vibration motor 48 is explained.

Figure 7:
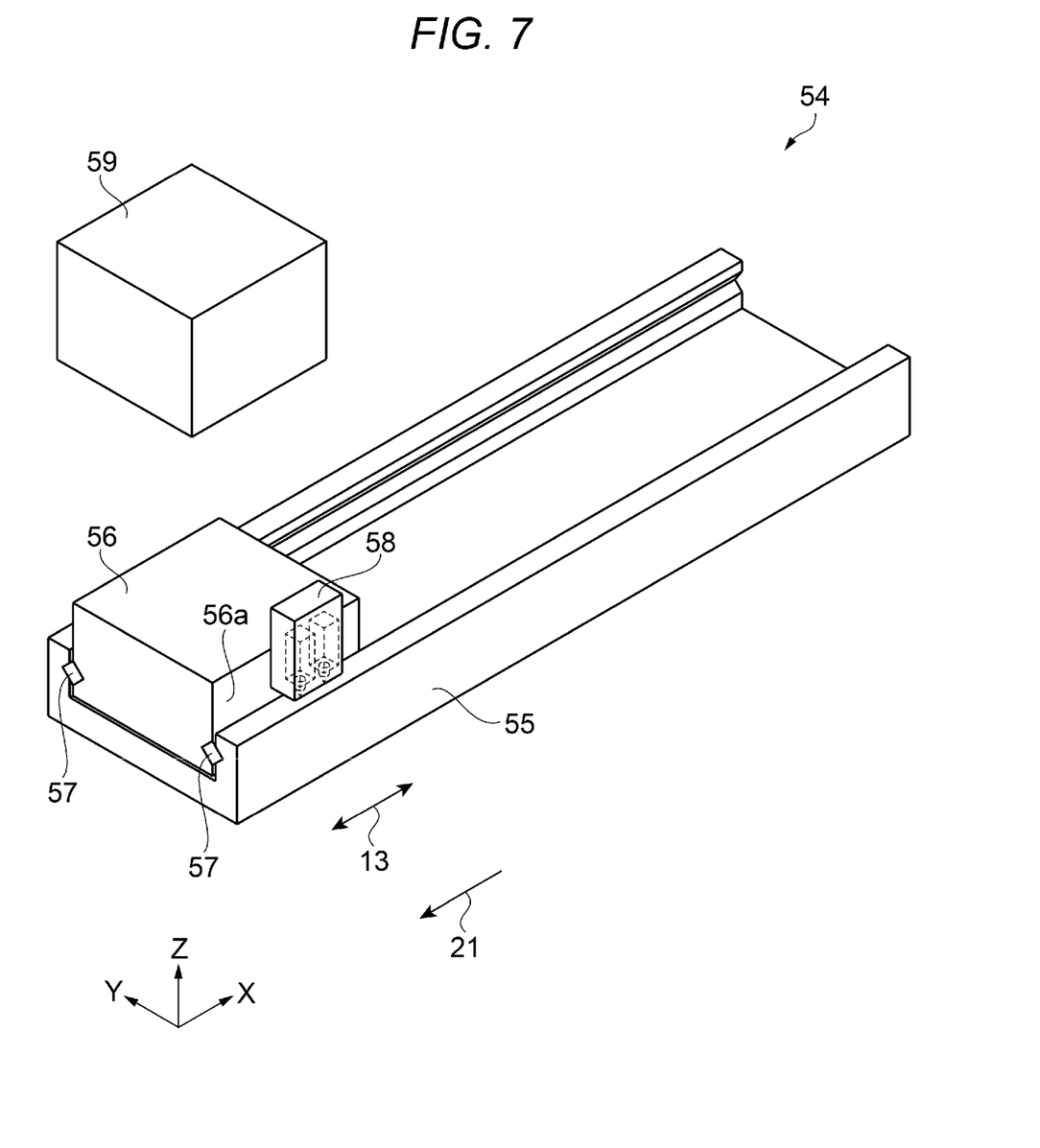
FIG. 7 is a schematic perspective view showing the configuration of a linear stage according to a fifth embodiment.

As shown in FIG. 7, a linear stage 54 functioning as the driving device includes a rail 55 long in one direction and a moving table 56. The moving table 56 is a substantially rectangular parallelepiped. The longitudinal direction of the moving table 56 is represented as an X direction and the width direction of the moving table 56 is represented as a Y direction. The thickness direction of the moving table 56 is represented as a Z direction. The X direction, the Y direction, and the Z direction are orthogonal to one another. A large number of cross rollers 57 are disposed between the rail 55 and the moving table 56. The cross rollers 57 are disposed on a Y positive direction side and a Y negative direction side of the moving table 56. The moving table 56 is disposed on a Z positive direction side of the rail 55. The moving table 56 is smoothly moved in the X direction by the cross rollers 57.

A vibration motor 58 is disposed on a side surface 56a on the Y negative direction side of the moving table 56. The vibration motor 58 is driven by a control device 59. The vibration motor 58 moves the moving table 56. Any one of the vibration motor 1, the vibration motor 34, the vibration motor 40, and the vibration motor 48 is used as the vibration motor 58.

With this configuration, the vibration motor 58 moves the moving table 56. Any one of the vibration motor 1, the vibration motor 34, the vibration motor 40, and the vibration motor 48 is used as the vibration motor 58. The vibration motor 1, the vibration motor 34, the vibration motor 40, and the vibration motor 48 are short in the driving direction 13 even if the motors include a plurality of vibrating bodies. Therefore, the linear stage 54 can be a device including the vibration motor 58 short in the driving direction 13.

Sixth Embodiment

In a sixth embodiment, an XY stage including any one of the vibration motor 1, the vibration motor 34, the vibration motor 40, and the vibration motor 48 is explained.

Figure 8:
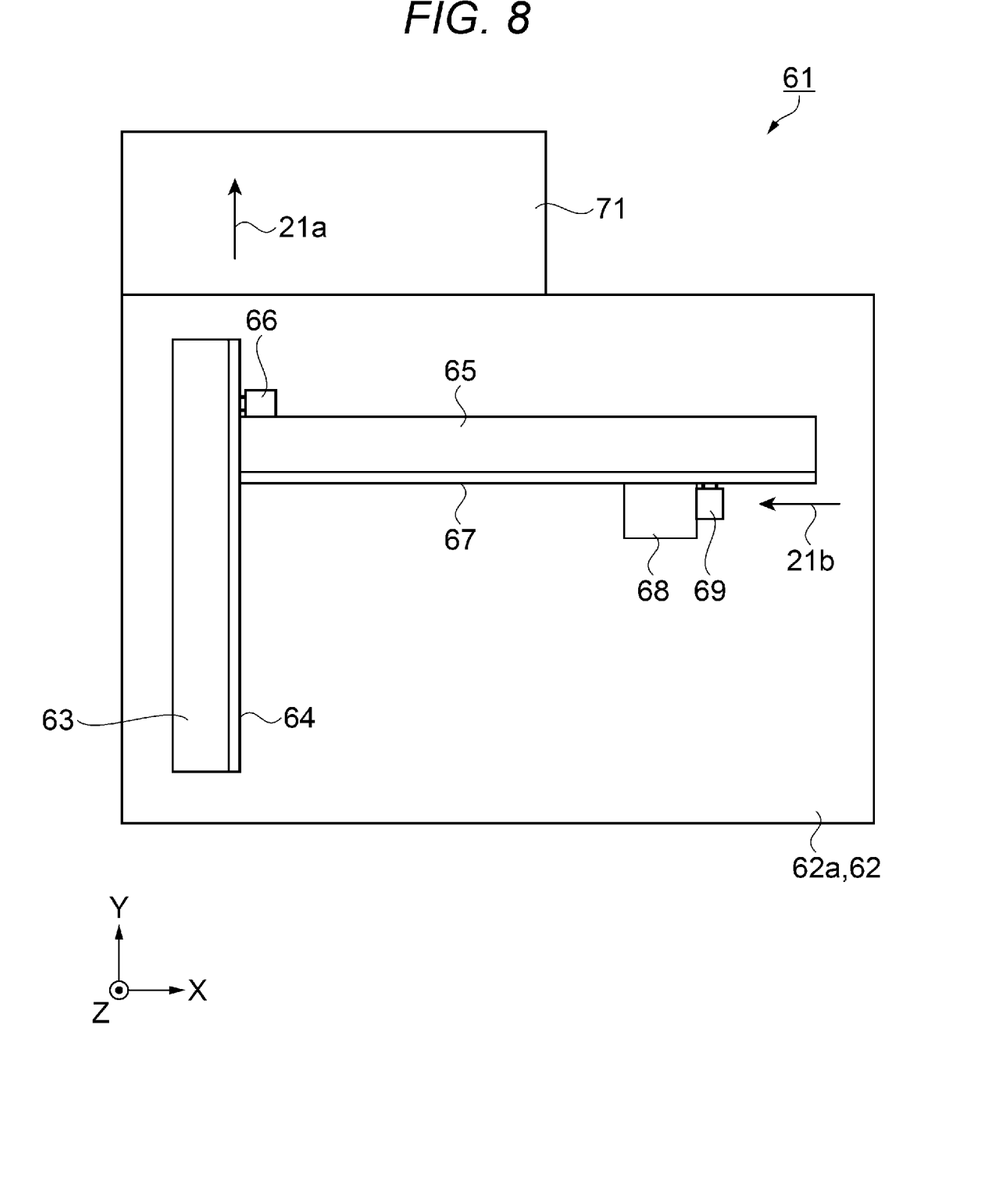
FIG. 8 is a plan view showing the configuration of an XY table according to a sixth embodiment.

As shown in FIG. 8, an XY stage 61 functioning as the driving device includes a base 62. Orthogonal two directions on an upper surface 62a of the base 62 are represented as an X direction and a Y direction. A direction orthogonal to the X direction and the Y direction is represented as a Z direction. A fixed table 63 long in the Y direction is disposed on the base 62. A first rail 64 long in the Y direction is disposed on an X positive direction side of the fixed table 63.

A Y table 65 functioning as the moving table that reciprocates in the Y direction along the first rail 64 is set on the X positive direction side of the first rail 64. A first vibration motor 66 functioning as the vibration motor is disposed on an X negative direction side on the surface on a Y positive direction side of the Y table 65. The first vibration motor 66 moves the Y table 65 with respect to the fixed table 63.

The shape of the Y table 65 is long in the X direction. A second rail 67 long in the X direction is disposed on a Y negative direction side of the Y table 65. An X table 68 functioning as the moving table that reciprocates in the X direction along the second rail 67 is set on the Y negative direction side of the second rail 67. A second vibration motor 69 functioning as the vibration motor is disposed on the Y positive direction side on the surface on the X positive direction side of the X table 68. The second vibration motor 69 moves the X table 68 with respect to the Y table 65. The first vibration motor 66 and the second vibration motor 69 are driven by a control device 71. Any one of the vibration motor 1, the vibration motor 34, the vibration motor 40, and the vibration motor 48 is used as the first vibration motor 66 and the second vibration motor 69.

With this configuration, the first vibration motor 66 moves the Y table 65. The second vibration motor 69 moves the X table 68. Any one of the vibration motor 1, the vibration motor 34, the vibration motor 40, and the vibration motor 48 is used as the first vibration motor 66 and the second vibration motor 69. The vibration motor 1, the vibration motor 34, the vibration motor 40, and the vibration motor 48 are short in the driving direction 13 even if the vibration motors include a plurality of vibrating bodies. Therefore, the XY stage 61 can be a device including the first vibration motor 66 short in the driving direction 13 and the second vibration motor 69 short in the driving direction 13. A first urging direction 21a of the first vibration motor 66 is equivalent to the urging direction 21 of the vibration motor 1, the vibration motor 34, the vibration motor 40, and the vibration motor 48. The driving direction 13 of the first vibration motor 66 is the first urging direction 21a and the opposite direction of the first urging direction 21a. A second urging direction 21b of the second vibration motor 69 is equivalent to the urging direction 21 of the vibration motor 1, the vibration motor 34, the vibration motor 40, and the vibration motor 48. The driving direction 13 of the second vibration motor 69 is the second urging direction 21b and the opposite direction of the second urging direction 21b.

Seventh Embodiment

In a seventh embodiment, a rotary driving device including any one of the vibration motor 1, the vibration motor 34, the vibration motor 40, and the vibration motor 48 is explained.

Figure 9:
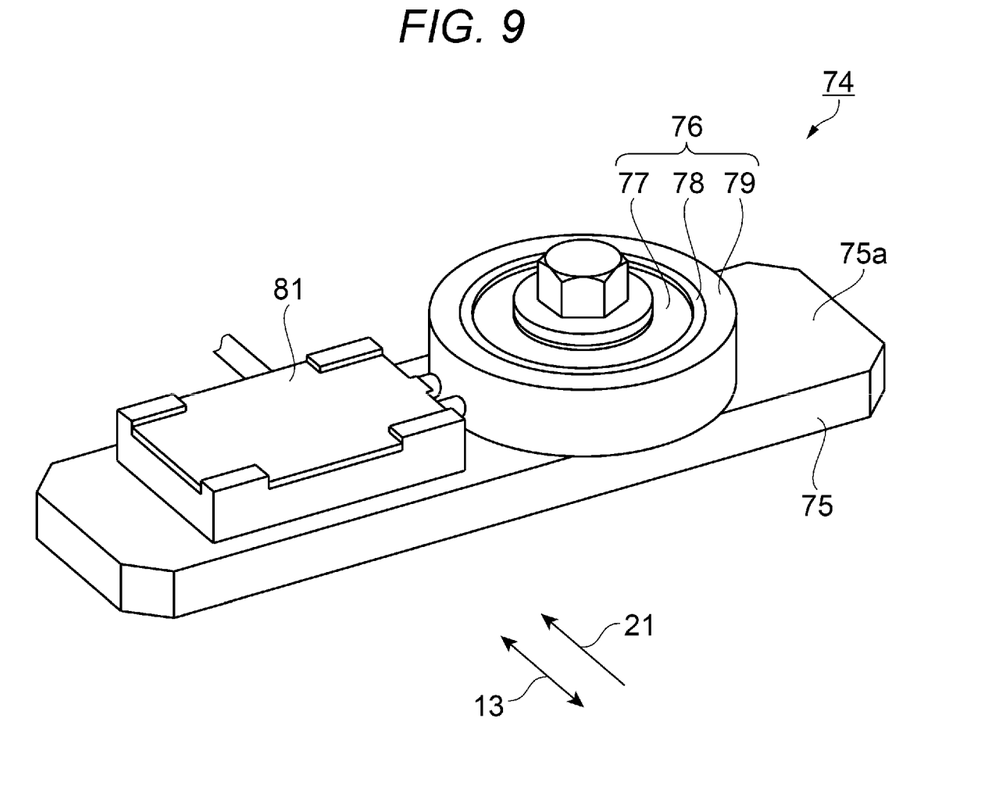
FIG. 9 is a schematic perspective view showing the configuration of a rotary driving device according to a seventh embodiment.

As shown in FIG. 9, a rotary driving device 74 functioning as the driving device includes a base 75. A rotary table 76 is disposed on an upper surface 75a of the base 75. The rotary table 76 includes a columnar fixed table 77, a ball bearing 78, and a rotary table 79 functioning as a cylindrical moving table. The fixed table 77, the ball bearing 78, and the rotary table 79 are coaxially disposed. Since the ball bearing 78 is disposed between the fixed table 77 and the rotary table 79, the rotary table 79 smoothly rotates with respect to the fixed table 77.

On the base 75, a vibration motor 81 is disposed on the outer circumference side of the rotary table 79. The vibration motor 81 moves a side surface of the rotary table 79 and rotates the rotary table 79. Any one of the vibration motor 1, the vibration motor 34, the vibration motor 40, and the vibration motor 48 is used as the vibration motor 81.

With this configuration, the vibration motor 81 rotates the rotary table 79. Any one of the vibration motor 1, the vibration motor 34, the vibration motor 40, and the vibration motor 48 is used as the vibration motor 81. The vibration motor 1, the vibration motor 34, the vibration motor 40, and the vibration motor 48 are short in the driving direction 13 even if the vibration motors include a plurality of vibrating bodies. Therefore, the rotary driving device 74 can be a device including the vibration motor 81 short in the driving direction 13.

Eighth Embodiment

In the first to fourth embodiments, the first vibrating body 7 and the second vibrating body 8 are used. The number of vibrating bodies may be three or more. As in the fourth embodiment, in a form in which a coil spring is disposed between two vibrating bodies, the vibrating bodies and the coil spring may be alternately disposed. When the number of vibrating bodies is three or more, the forms in the first to fourth embodiments may be combined.

What is claimed is:

1. A vibration motor comprising:
a plurality of vibrating bodies including projections, the plurality of vibrating bodies receiving electric power and vibrating to generate a driving force and transmitting the driving force to a driven section;
a first urging section configured to urge the plurality of vibrating bodies in a driving direction and restrict positions of the plurality of vibrating bodies in the driving direction; and
a case housing the plurality of vibrating bodies and the first urging section, wherein
the plurality of vibrating bodies and the first urging section are arranged in the driving direction, and
a number of first urging sections is smaller than a number of the plurality of vibrating bodies in the urging direction.

2. The vibration motor according to claim 1, wherein the plurality of vibrating bodies is disposed between an inner surface of the case and the first urging section.

3. The vibration motor according to claim 2, wherein the plurality of vibrating bodies includes a first vibrating body and a second vibrating body,
a first supporting section configured to support the first vibrating body and a second supporting section configured to support the second vibrating body are disposed between the first vibrating body and the second vibrating body, and
the first supporting section and the second supporting section are integrated.

4. The vibration motor according to claim 1, wherein
the first urging section is disposed between a pair of the plurality of vibrating bodies, and
the first urging section urges the respective vibrating bodies in opposite directions from each other.

5. The vibration motor according to claim 1, further comprising a second urging section configured to urge the plurality of vibrating bodies toward the driven section, wherein
a number of the second urging sections is smaller than a number of the plurality of vibrating bodies in a direction in which the plurality of vibrating bodies is arranged.

6. A driving device comprising:
a moving table; and
the vibration motor according to claim 1 configured to move the moving table.

* * * * *